(No Model.)

A. CHAPMAN.
SHOE.

No. 417,542. Patented Dec. 17, 1889.

Witnesses
Wm H. Brereton
H. E. Brereton.

Inventor
Amos Chapman

By his Attorney
J. W. Tallmadge

UNITED STATES PATENT OFFICE.

AMOS CHAPMAN, OF SAYBROOK, ILLINOIS.

SHOE.

SPECIFICATION forming part of Letters Patent No. 417,542, dated December 17, 1889.

Application filed August 21, 1889. Serial No. 321,496. (No model.)

*To all whom it may concern:*

Be it known that I, AMOS CHAPMAN, a citizen of the United States, residing at Saybrook, in the county of McLean and State of Illinois, have invented a new and useful Improvement in Horseshoes, of which the following is a specification.

My invention is a horseshoe, and the object thereof is to place the greatest bearing-surface upon the frog of a horse's foot, instead of upon the outer edge of the hoof, as in ordinary shoes, for the purposes as will presently appear.

In carrying out my invention I proceed as follows, reference being had to the accompanying drawings, forming a part hereof, and in which drawings—

Figure 1:
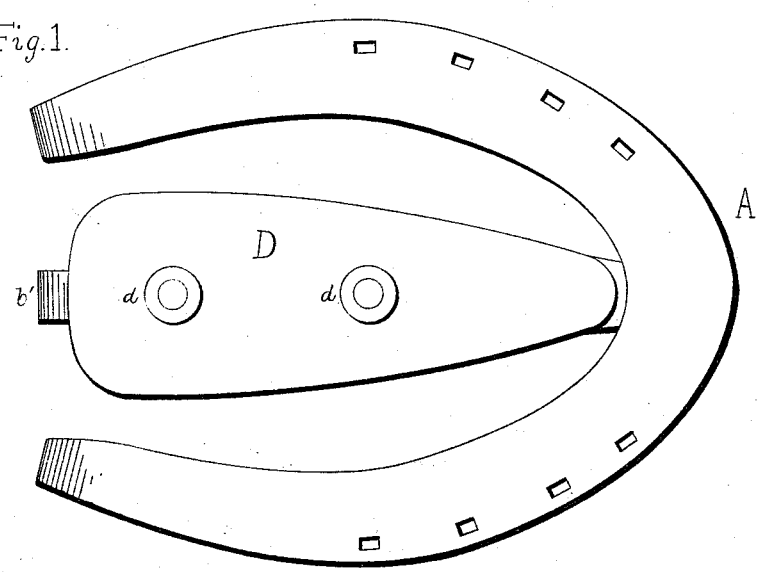
Figure 2:
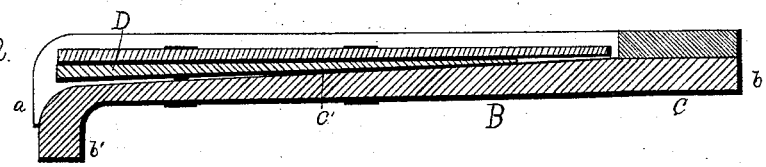
Figure 3:
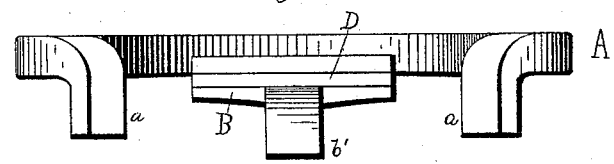

Figure 1 is a plan view, and Fig. 2 a central longitudinal sectional view, of a horseshoe constructed according to my invention. Fig. 3 is a rear view of the same.

The letter A indicates the shoe proper, which may be of the usual shape, and having heel-calks $a$.

B is a rigid bar or plate welded to the toe of the shoe and forming a toe-calk, as at $b$, and at its rear having a heel-calk $b'$. This bar is made thicker at its forward end, as at $c$, and with an inclined surface $c'$, tapering toward the heel, as shown in Fig. 2, and, as shown in Fig. 1, this bar is made somewhat wider at the heel than at the toe, approaching the outline of the frog of a horse's foot, and upon the top surface of this bar is secured by rivets $d$ an elastic cushion D, preferably of layers of leather, to prevent injury to the frog.

As shown in Fig. 2, the bar B at its front end forms a calk for the shoe, and its rear end projects below the surface of the calks $a$, so that as said bar is made rigid and unyielding, being made heavy at the point $c$ for this purpose, the pressure is brought directly upon the frog and the pressure upon the rim of the hoof reduced to a minimum, so that said shoe will be found useful in case of horses having corns, weak heels, or contracted hoofs.

Having thus described my invention, I claim—

The horeshoe herein described and shown, composed of shoe A, with heel-calks $a$, rigid inelastic bar B, welded to the shoe and forming a toe-calk $b$, and with heel-calk $b'$, said bar being thicker at its front than at its rear and with an inclined surface $c'$, and made wider at the rear than at the front, and cushion D, secured by rivets $d$ to the bar $b$, as and for the purposes specified.

In testimony that I claim the foregoing as my own I have hereto affixed my signature in presence of two witnesses.

AMOS CHAPMAN.

Witnesses:
CHARLES A. HILDRETH,
OWEN J. CHENEY.